United States Patent
Ota et al.

(10) Patent No.: US 6,982,983 B2
(45) Date of Patent: Jan. 3, 2006

(54) COMMUNICATIONS NETWORK SYSTEM USING GATEWAY

(75) Inventors: Katsumi Ota, Kanagawa (JP); Ricardo Wong, Kanagawa (JP); Takeshi Akatsuka, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 839 days.

(21) Appl. No.: 09/834,644

(22) Filed: Apr. 16, 2001

(65) Prior Publication Data

US 2001/0042137 A1 Nov. 15, 2001

(30) Foreign Application Priority Data

May 11, 2000 (JP) ..................................... 2000-138197

(51) Int. Cl.
*H04L 12/56* (2006.01)

(52) U.S. Cl. ........................................ 370/401; 340/3.5
(58) Field of Classification Search ................ 370/401, 370/402, 403, 404; 340/3.5, 5.72
See application file for complete search history.

(56) References Cited

U.S. PATENT DOCUMENTS

| | | | |
|---|---|---|---|
| 5,959,572 A | 9/1999 | Higashimata et al. | |
| 6,141,014 A | 10/2000 | Endo et al. | |
| 6,141,710 A | 10/2000 | Miesterfeld | |
| 6,182,171 B1 | 1/2001 | Akatsuka et al. | |
| 6,226,270 B1 * | 5/2001 | Chiku et al. | 370/248 |
| 6,236,678 B1 * | 5/2001 | Horton et al. | 375/222 |
| 6,307,837 B1 * | 10/2001 | Ichikawa et al. | 370/230 |
| 6,396,833 B1 * | 5/2002 | Zhang et al. | 370/392 |
| 6,490,289 B1 * | 12/2002 | Zhang et al. | 370/401 |

FOREIGN PATENT DOCUMENTS

JP 7-210473 8/1995

* cited by examiner

*Primary Examiner*—Ricky Ngo
*Assistant Examiner*—Richard Chang
(74) *Attorney, Agent, or Firm*—McDermott Will & Emery LLP

(57) ABSTRACT

A communications network system which is capable of continuously performing a normal communications of data on a communication cable. A Navigation unit 30 transmits an intersection data having ID0001 to an automatic transmission control unit 10 via communications cable. A gateway 50 which accepts communications from an information system network B to a control system network A is intervened on a communications line between both networks. When detecting a sending data having an ID code of ID0001, gateway 50 compares its communication period 0 of the data with previously stored communications period. If they are coincident with each other, the communications from network B to network A is enabled. If communications periods are incoincident with each other, the ID code when the intersection data is transmitted is changed to ID0110 and communications enabling (accepting) ID code by gateway is also changed from ID0001 to ID0110.

16 Claims, 5 Drawing Sheets

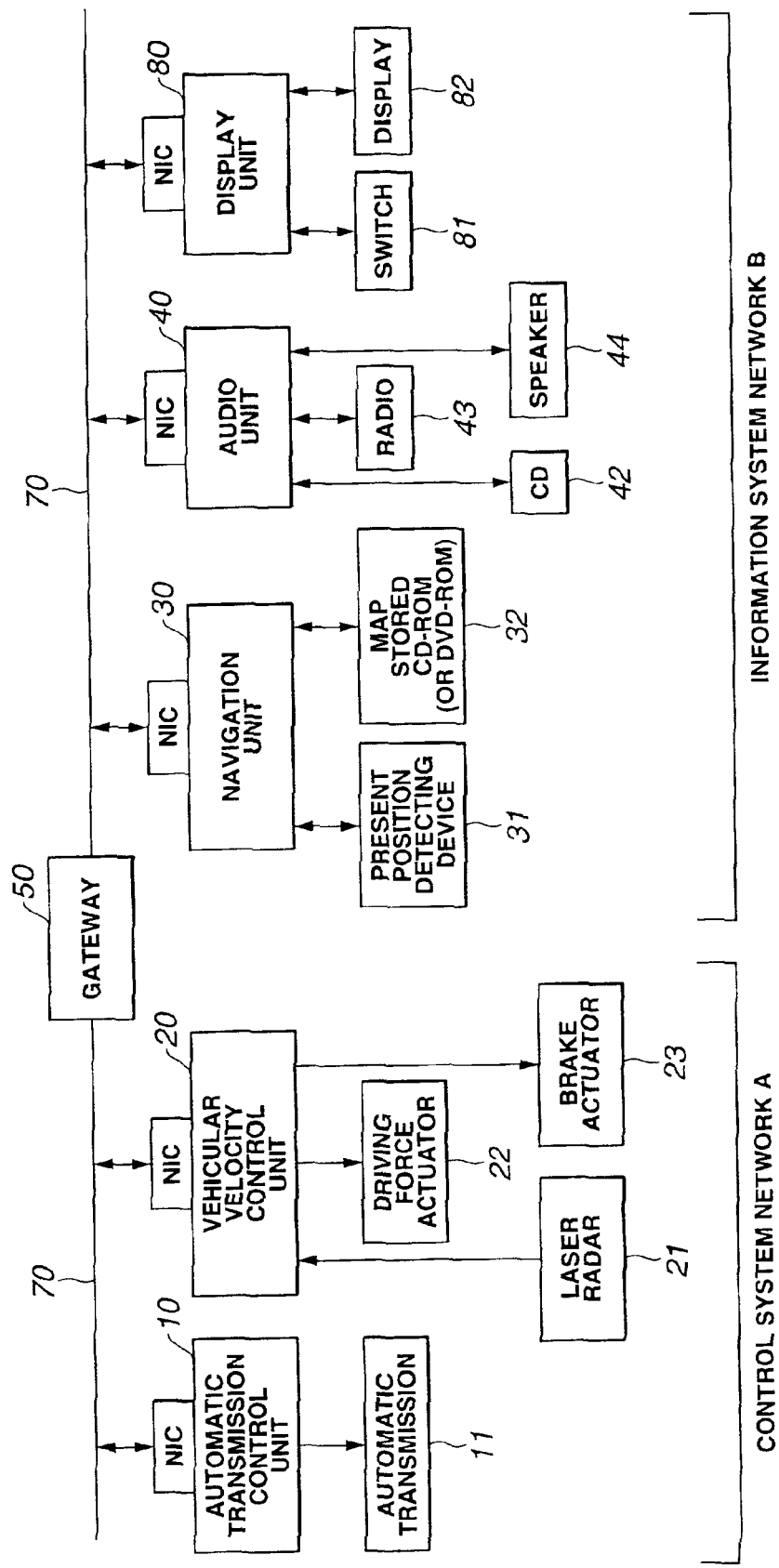

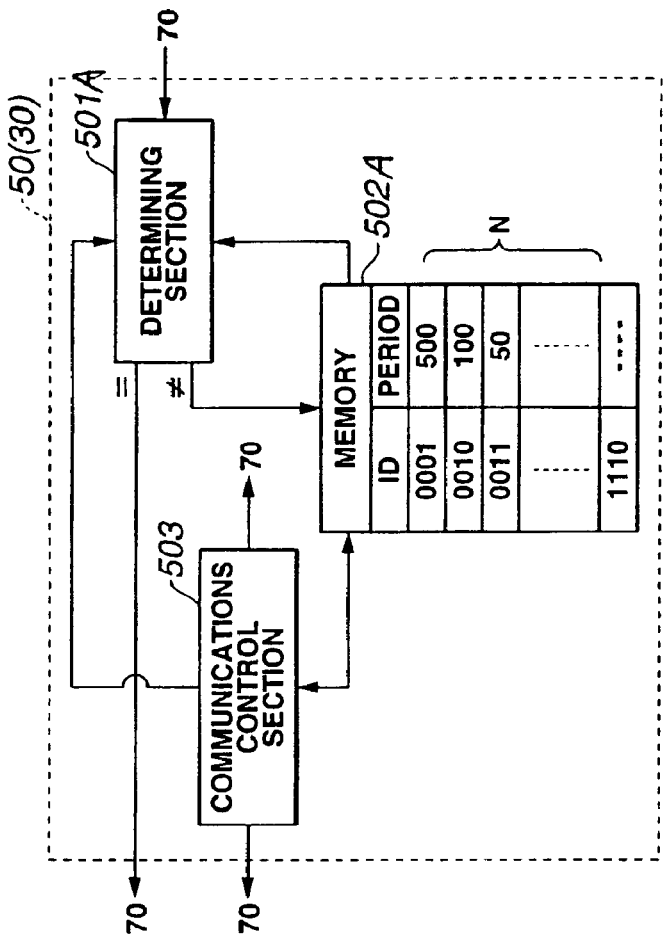
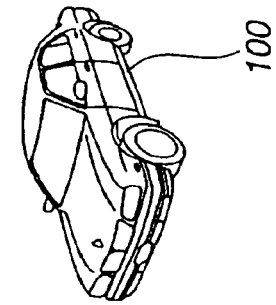
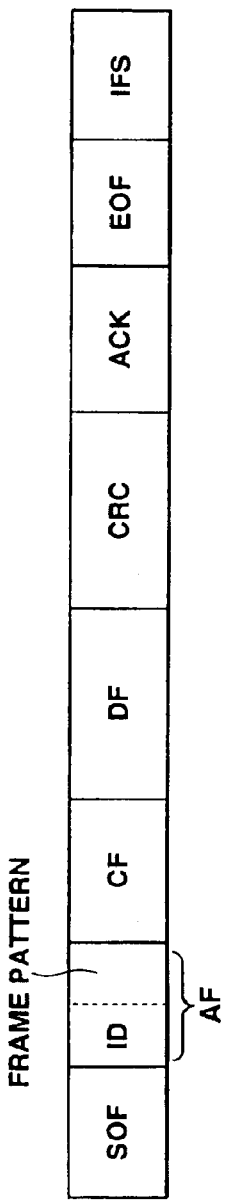

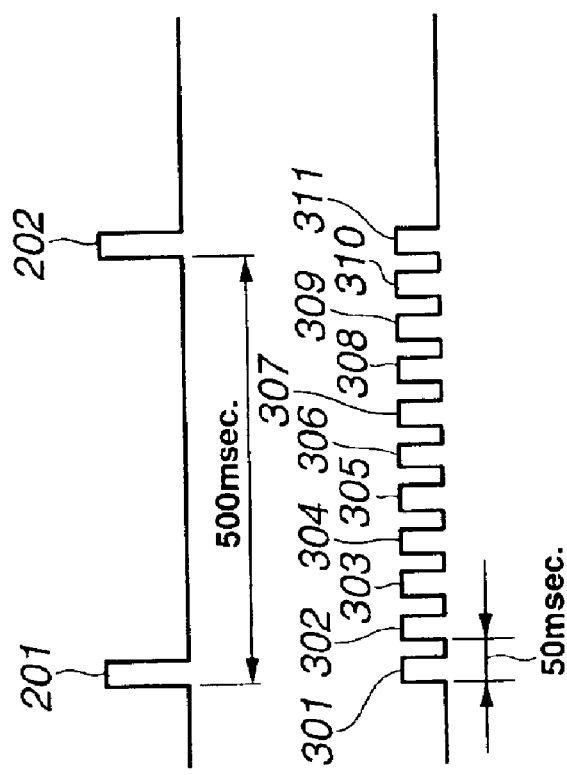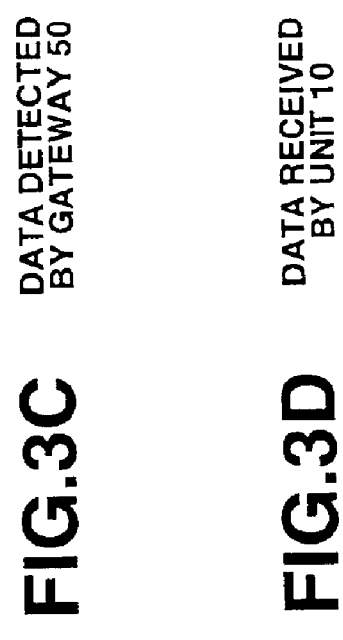
FIG.3A INTERSECTION DATA ON UNIT 30 (ID0001)
FIG.3B DESTINATION SET DATA ON UNIT 80 (ID0011)
FIG.3C DATA DETECTED BY GATEWAY 50
FIG.3D DATA RECEIVED BY UNIT 10

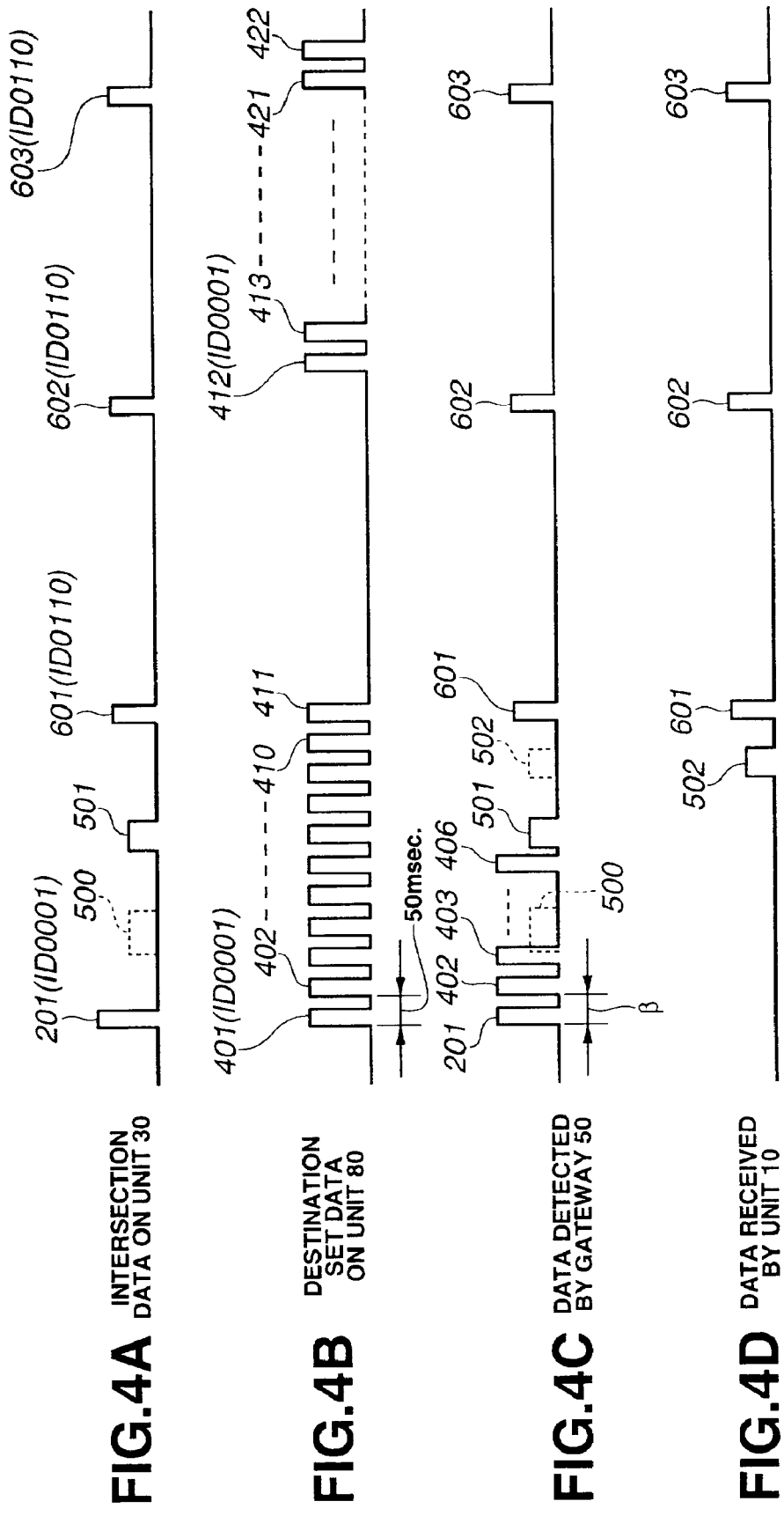

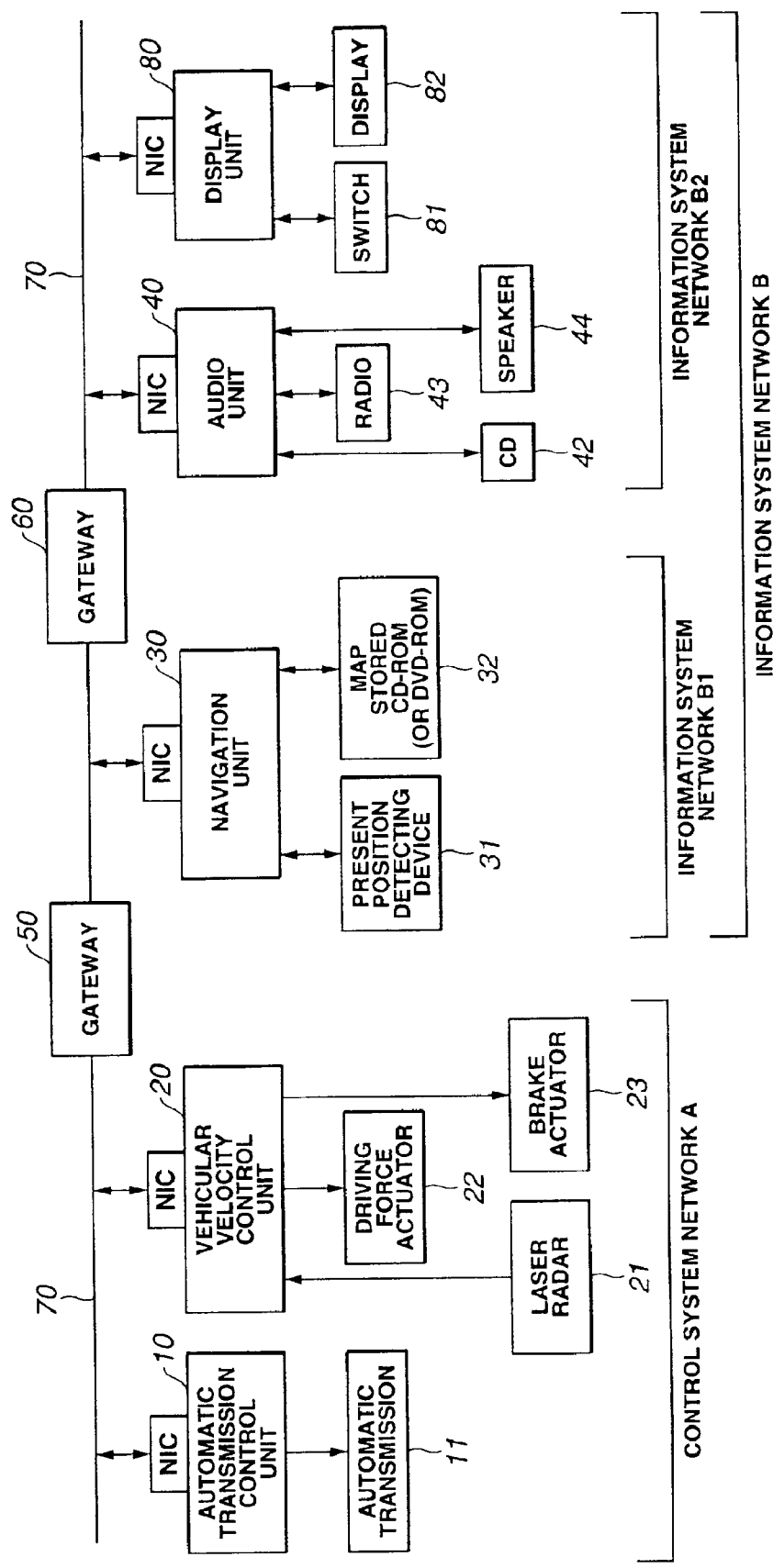

COMMUNICATIONS NETWORK SYSTEM USING GATEWAY

BACKGROUND OF THE INVENTION a) Field of the Invention

The present invention relates to a data communications network system in which a communications signal having a data identification information is transmitted and received by a plurality of data transmission and reception units which belong to different local area networks (LANs).

b) Description of the Related Art

It is well known that a plurality of units (so-called, nodes) are connected to computer communications network and multiplexing of communications of data are carried out between the units. Such a computer communications network as described above is intervened between pieces of electronic equipments mounted in an automotive vehicle.

For example, a vehicular velocity control unit to adaptively control a vehicular velocity, a car navigation unit to inform a vehicular occupant of a vehicular information, an audio unit, and so forth are interconnected via a communications line. A specific ID (Identification) code is assigned to the communications signal transmitted from each unit on the communications line.

When the communications signal is applied to a broadcast communication system adopted LAN (Local Area Network) such as a CAN (Controller Area Network), an ID filter is provided in each data reception unit on a presumption that no doubled ID codes is present so that only the data having the required ID code is selectively received.

The ID code of the transmission data to be retrieved in the corresponding unit(s) is previously set and, if the ID code of the transmitted data on the communications line is the same as the ID code present in the corresponding unit, the transmitted data is retrieved into the unit.

In the above-described computer communications network, a data on a road gradient value calculated by the car navigation unit is, for example, transmitted to the vehicular velocity unit in which a down-shift control for a gear ratio of an automatic transmission is carried out on the basis of the transmitted road gradient value data.

Various kinds of transmission data are transmitted from the unit connected to the communications line with the individual ID codes attached thereto.

To transmit only the road gradient value data to the vehicular velocity control unit without failure, a gateway (module) is interposed in communications line between the vehicular velocity control unit and another communications unit. The gateway (module) is used to interconnect different systems or different networks. The gateway module, in the above-described example, transmits only the road gradient value data from among the data to be transmitted from the network including the navigation unit to the other network including the vehicular velocity control unit.

However, even if a transmission/reception function of each unit is normal, a trouble such as a short-circuiting occurs in a circuitry to supply the transmission data on the communications line so that an erroneous ID code which is different from a normal ID code that the transmission data naturally has is often attached onto the transmission data and is transmitted onto the communications line.

At this time, the unusual ID code may be considered to be the same as the ID code attached to the road gradient value data. If such a trouble as described above occurs in an audio unit, the audio data having accidentally the same ID code as the road gradient value data passes through the gateway module so as to be transmitted to the vehicular velocity control unit.

This audio data has the same ID code as the road gradient value data so as to be retrieved into the vehicular velocity control unit. Accordingly, an erroneous operation in the vehicular velocity control unit may occur since the retrieved data is not the road gradient value data that the vehicular velocity control unit should receive.

SUMMARY OF THE INVENTION

It is, hence, an object of the present invention to provide a communications network system which is capable of continuously performing normal communications between the data transmission unit and the data reception unit even if the ID code of the communications signal is changed due to the trouble described above.

The above-described object can be achieved by providing a communications network system, comprising: a communications line; a data transmission unit that transmits a data having a specific ID code at a predetermined communications period to the communications line; a data reception unit that receives the data transmitted from the data transmission unit on the communications line; a determining unit that determines whether a communications period of the transmitted data on the communications line having the ID code which is equal to the specific ID code which is set as a communications acceptance ID code is coincident with the predetermined communications period; and a communications acceptance unit that accepts a communication of the data from the data transmission unit to the data reception unit only if the data provides the ID code which is equal to the specific ID code and provides the communications period which is coincident with the predetermined communications period determined by the determining unit.

The above-described object can also be achieved by providing A method applicable to a communications network system, the communications network system comprising: a communications line; a data transmission unit that transmits a data having a specific ID code at a predetermined communications period to the communications line; and a data reception unit that receives the data transmitted from the data transmission unit on the communications line, the method comprising: determining whether a communications period of the transmitted data on the communications line having the ID code which is equal to the specific ID code which is set as a communications acceptance ID code is coincident with the predetermined communications period; and accepting a communication of the data from the data transmission unit to the data reception unit via the communications line only if the data provides the ID code which is equal to the specific ID code and provides the communications period which is coincident with the predetermined communications period determined at the determining step.

BRIEF DESCRIPTION OF THE DRAWINGS

FIG. 1A is a block diagram of a communications network system representing a first preferred embodiment of the communications network system according to the present invention is applicable.

FIG. 1B is an overall view of an automotive vehicle to which the first preferred embodiment of the communications network shown in FIG. 1A is applicable.

FIG. 1C is an internal functional block diagram of an example of a gateway shown in FIG. 1A.

FIG. 2 is an explanatory view of a communications format used for transmission data from each unit connected to a communications line shown in FIG. 1A.

FIGS. 3A, 3B, 3C, and 3D are timing charts for explaining an operation of the gateway shown in FIG. 1A when a data transmission is normally carried out.

FIGS. 4A, 4B, 4C, and 4D are timing charts for explaining the operation of the gateway shown in FIG. 1A when a data transmission is erroneously carried out due to a trouble and the erroneous data transmission is recovered.

FIG. 5 is a circuit block diagram representing a modification of the first preferred embodiment of the communications network according to the present invention.

DETAILED DESCRIPTION OF THE PREFERRED EMBODIMENTS

Reference will hereinafter be made to the drawings in order to facilitate a better understanding of the present invention.

(First Embodiment)

FIG. 1A shows a first preferred embodiment of a communications network system according to the present invention applicable to an automotive vehicle.

FIG. 1B shows the automotive vehicle to which the communications network system shown in FIG. 1A is applicable.

FIG. 1C shows an internal functional block diagram of a gateway (module) shown in FIG. 1A.

In FIG. 1A, a control system network A for a vehicular run is connected to a vehicular information system network B via a single communications line (cable) 70.

In the control system network A, an automatic transmission control unit 10 to control over an automatic transmission 11 and a vehicular velocity control unit 20 to control a vehicular velocity of the vehicle 100 are connected to the communications line 70 via their own built-in Network Interface Card (or module) (NIC).

The vehicular velocity control unit 20 controls a driving force actuator 22 such as an engine throttle valve actuator and a brake actuator 23 of a vehicular brake system on the basis of an input signal from a laser radar 21.

The vehicular velocity control unit 20 is exemplified by a U.S. Pat. No. 5,959,572 issued on Sep. 28, 1999, the disclosure of which is herein incorporated by reference.

On the other hand, in the information system network B, a (car) navigation unit 30 to help a guidance of the vehicle 1000 shown in FIG. 1B to a destination that a vehicular driver is desired to reach, an audio unit 40, and a display unit 80 are connected to the communications line 70.

First, the units constituting the information system network B will be described with reference to FIGS. 1A and 1B.

A present position detecting device 31 and a map stored CD-ROM (Compact Disc Read Only Memory) are connected to the navigation unit 30. The present position detecting device 31 includes a GPS (Global Positioning System), a gyroscope, and/or a vehicular velocity sensor. The present position detecting device 31 detects the present position of the vehicle 100. The navigation unit 30 (navigation system) is exemplified by a U.S. Pat. No. 6,141,014 issued on Oct. 31, 2000, the disclosure of which is herein incorporated by reference.

The (car) navigation unit 30 extracts a road map data of a place surrounding the vehicle 100 in which the vehicle 100 is running from the CD-ROM 32 (or DVD-ROM) and transmits the extracted road map data and the present position of the vehicle 100 to the display unit 80 to display the road map and the present position through a display 82 of the display unit 80.

In addition, the navigation unit 30 calculates "whether the present position of the vehicle 100 is on a traffic intersection" and "a road gradient of the present position is approximately equal to a predetermined road gradient value, respectively, on the basis of the detected present position and the road map data of the road map stored CD-ROM 32. A former calculation result is transmitted to the automatic transmission control unit 10 via the communications line 70 and a latter calculation result is transmitted to the vehicular velocity control unit 20.

A CD (Compact Disc) player 42 and a radio 43 are connected to the audio unit 40. A selective switch 81 connected to the display unit 80 is operated to select these pieces of equipment 42 and 43.

When the selective switch 81 selects one of the pieces of equipment 42 or 43, its selection information is transmitted to the audio unit 40 via the communications line 70 so that a selected music source, for example, a music sound from the CD player 42 is outputted through a speaker 44. The selective switch 81 and the display 82 (such as a LCD (Liquid Crystal Display)) are connected to the display unit 80. The selective switch 81 performs the music source of the audio unit 40 and performs a selection of various kinds of operations on the navigation unit 30.

For example, the selective switch 81 is operated to set the destination through the navigation unit 30 and is operated to set a scale reduction/expansion of a display region of the road map. These operation information are transmitted via the communications line 70 to the navigation unit 30 performs a predetermined process on the basis of the received operation information and transmits the present position information and the display region information on the operation information to the display unit 80 via the communications line 70. The display unit 80, upon receipt of these pieces of information, displays the present position and display region through the display 82.

Next, the units constituting the control system network A will be described with reference to FIGS. 1A and 1B.

The automatic transmission control unit 10 controls a hydraulic of the automatic transmission 11 in a well-known method on the basis of the input information from an engine and vehicular velocity sensor to adjust a speed reduction ratio of the vehicle. In addition, the automatic transmission control unit 10 performs a gear down shift control by controlling the hydraulic in the automatic transmission (A/T) unit 11 in the well known method when, for example, the present position is near to the traffic intersection on the basis of the data of "whether the present position is on the intersection" (intersection data) described above transmitted from the navigation unit 30.

The vehicular velocity control unit 20 controls the drive of the engine throttle valve through the driving force actuator 22. The brake actuator 23 controls the brake pressure to regulate a driving force exerted by the vehicle 100 or a braking force applied to the vehicle 100.

For example, upon a detection of an obstacle such as a preceding vehicle which is running ahead of the vehicle at the same traffic lane by means of the laser radar 21 connected to the vehicular velocity control unit 20, either the drive of the engine throttle valve or the brake pressure control is carried out to maintain a constant interval to the preceding vehicle or obstacle so that the vehicle 100 can follow the preceding vehicle. In addition, the vehicular velocity control unit 20 controls the driving force actuator 22 so that the engine output becomes larger when determining that the road gradient value data is equal to or larger than the predetermined road gradient value on the basis of the road gradient value to be transmitted from the navigation unit 30.

Next, a gateway (module) 50 intervened on the communications line 70 between the control system network A and the information system network B will be described below with reference to FIGS. 1A through 1C.

The gateway 50 intervened on the communications line 70 between the control system network A and the information system network B to adjust or convert communications protocols effected between the control system network A and the information system network B and to logically connect both networks A and B.

Consequently, data transfer between the control and information system networks A and B becomes possible, those having mutually different communications protocols.

In addition, a transmission data to be transmitted from each unit has a specific ID (Identification) code to the data. The gateway 50 provides a function to accept (allow) an access of only the transmission data having the specific ID code from the information system network B to the control system network A and vice versa.

A previously proposed communications network system has the gateway such as to determine an acceptance or inhibit of a passage for the ID code assigned to the transmission data. However, in the first embodiment, the gateway 50 is provided with a memory 502A in which the ID codes allowing the passage of the transmission data and their communication periods of the transmission data having the ID codes allowing the passage thereof and carries out the passage enable and disable of the transmission data on the basis of the ID code and communications period of the transmitted data.

The more detailed explanation of gateway 50 will be described later.

Suppose that gateway 50 shown in FIGS. 1A and 1C is so constructed that only an intersection data and a road gradient value data transmitted from the navigation unit 30 is enabled (accepted) to be transmitted to the control system network A, in the explanations thereof to be described below.

FIG. 2 shows an example of communications format of the transmitted data to be transmitted from each unit shown in FIG. 1A.

In FIG. 2, SOF (Start Of Frame) indicates a start of a message. When SOF is received, each unit connected to the communications line 70 starts a reception of this SOF. The subsequent AF (Arbitration Field) indicates the ID code and a frame pattern. The frame pattern includes four patterns: 1) a data frame representing that this is a message for the data to be transmitted; 2) a remote frame representing that this is a message requesting the data transmission; 3) an error frame representing that each unit automatically transmits when the error is formed; and 3) an overload frame representing that each unit automatically transmits when a reception preparation is still not ended. A CF (Control Field) represents a data length code (DLC) of a byte length of the data. A DF (Data Field) represents an error if the message of the data transmission. A CRC (Cyclic Redundancy Check) (CRC field) used to check to see whether the error is present in the transmitted message and for an error correction. An ACK (Acknowledge Field) indicates whether a normal transmission confirmation has been carried out.

An EOF (End Of Field) indicates an end of the message.

An IFS (Inter-Frame Space) indicates an end of each frame.

In addition, the transmission data transmitted from each unit to the communications line 70 is transmitted at a prescribed communications period for each transmission data.

In the first embodiment, the communications period of the intersection data transmitted from navigation unit 30 is set to 500 (milliseconds) and that of the road gradient data is set to 100 (milliseconds). In addition, the operation data of the selection switch 81 transmitted from display unit 80, for example, the communications period of the destination setting data is set to 50 (milliseconds).

In addition, the kinds of transmission data transmitted in the first embodiment and these ID codes (initial set) are as follows: 1) Intersection data: The intersection data is transmitted from navigation unit 30 to automatic transmission control unit 10. The ID code is 0001. Hereinafter, this is called ID0001; 2) Road gradient value data: The road gradient data is transmitted from navigation unit 30 to vehicular velocity control unit 20. The ID code is 0010; 3) Destination setting data: The destination setting data is transmitted from display unit 80 to navigation unit 30. The ID code is 0011; 4) Scale reduction set data: The scale reduction set data is transmitted from display unit 80 to navigation unit 30. The ID code is 0100; 5) Selection data; When the music source is selected, the selection data is transmitted from display unit 80 to audio unit 40. The ID code is 0101.

If the short-circuiting occurs in an output circuit of each unit, the ID code of the transmission data would often be changed. The destination setting data transmitted from display unit 80 to navigation unit 30 is ID0011. Suppose that this ID code is changed to ID0001.

At this time, in a case where the gateway 50 described above determines the communications enabling and disabling of only the ID code used in the previously proposed communications network, the gateway 50 would be recognize that the destination setting data having the ID code of 0001(ID 0001) transmitted from display unit 80 is the intersection data transmitted from navigation unit 30 to the automatic transmission control unit 10 so that the communication to the control system network A would be enabled.

Since the automatic transmission control unit 10 of the control system network A recognizes whether the transmission data on the communications line 70 is destined to the unit 10 itself only from the ID code, the automatic transmission control unit 10 retrieves the destination setting data from the communications line 70 upon recognition that the destination setting data is the intersection data and calculates a manipulation variable of the automatic transmission 11 in accordance with the destination setting data.

However, since the destination setting data having the ID code of 0001 is different from the intersection data having the ID code of 0001, the automatic transmission control unit 10 would erroneously be operated.

Next, an operation of the gateway 50 in the first preferred embodiment will be described below with reference to FIGS. 1A and 1C.

The gateway 50 includes: the memory 502A previously storing the ID codes on the intersection data to accept the communication via the communications line 70 and road gradient value data to accept the same and their communications periods in pairs as: (ID (code), communication periods in milliseconds)=(ID0001, 500 (milliseconds)), (ID0010, 100 (milliseconds)).

Then, comparing the ID code of the actually transmitted data on the communications line 70 and its communications period within those of the stored in a pair form in the memory 502A by means of a determining section 501A to determine whether both of them are equal to each other, respectively.

When both of ID and communications period are equal to the stored ID and communications period, respectively, only the transmitted data, namely, the intersection data and road gradient value data are accepted to be transmitted to the control system network A.

It is noted that in a case where although the ID code of the transmitted data is equal to the stored ID code, the detected communications period is different from the stored communications period, the gateway 50 determines that there is a trouble in any one of the units in the information system network B and the transmitted data is disabled (inhibited) to communicate with the unit in the control system network B. In the latter case, an ID code replacing (changing) process as will be described later is carried out.

FIGS. 3A, 3B, 3C, 3D, 4A, 4B, 4C, and 4D show timing charts for explaining two operations of a communication procedure carried out in the gateway 50 when receiving two kinds of the transmission data having ID0001, viz., the intersection data and the destination set data having the ID 0001 which is different from the ID code that the destination set data naturally has.

FIGS. 3A and 4A show the intersection data (ID0001) transmitted from navigation unit 30.

FIGS. 3B and 4B show the destination set data (ID0011).

FIGS. 3C and 4C show data detected by the gateway 50 having ID0001.

FIGS. 3D and 4D show the intersection data received by the automatic transmission control unit 10.

It is noted that, in FIGS. 3A through 4D, each transmission data is expressed in a pulse train signal form and a magnitude of an amplitude of each pulse train signal serves to express a difference in ID code.

It is also noted that FIGS. 3A through 3D shows cases where the transmission data are normally transmitted.

As shown in FIG. 3A, the intersection data 201 and 202 transmitted from navigation unit 30 are usually provided with ID0001 and with communications period of 500 (milliseconds). On the other hand, the destination set data 301 through 311 transmitted from display unit 80 is provided with ID0011 and with the communications period of 50 (milliseconds), as shown in FIG. 3B.

The determining section in the gateway 50, after the transmitted data pulses 201 and 202 having the ID0001 are detected, compares the corresponding communication period α with the stored communications period of 500 (milliseconds).

If they are equal to each other, gateway 50 determines that each unit in the information system network B is, at the present time, normally operated and accepts the transmitted data of ID0001 to be transmitted on the communications line 70 in the control system network A as the (true) intersection data. After the communications acceptance is carried out in the gateway 50, a monitoring of whether data of ID0001 has the communications period of 500 (milliseconds) is continued with time. Since the transmitted data pulses 201 and 202 which are accepted by gateway 50 have ID0001, the automatic transmission control unit 10 retrieves this data pulses from the communications line 70 after the pass of the gateway 50.

The automatic transmission control unit 10 performs a predetermined control operation on the basis of this data. On the other hand, since the destination set data pulses 301 through 311 from display unit 80 are provided with ID0011 that this data naturally has and the communication period thereof is determined to be predetermined 50 milliseconds, this data pulses are not determined not to pass (does not accept) by gateway 50 as the data of ID0001.

FIGS. 4A through 4D show a case where a trouble in an output circuit of display unit 80 occurs and ID on the destination set data is changed from ID0011 to ID0001. The destination set data pulses 401 through 411 having ID0001 are transmitted serially from display unit 80. FIGS. 4A through 4D show that the destination set data pulses 401 through 411 are erroneously provided with ID0001 which have the same magnitude of amplitude of the pulses equal to intersection data (ID0001) having the same ID code. The destination set data pulses 401 through 411 have ID0001. Hence, in the gateway 50, upon the determination of a first pulse of the intersection data 201 (or destination set data 401), the subsequent destination set data pulses 402, 403, - - - are detected. In this case, since an interval of time β between the intersection data 201 and destination set data 402 is 50 (milliseconds), the interval of time is shorter than the communications period (500 milliseconds) stored in a memory location at which the data communications period of the transmitted data having ID0001 is stored. Hence, the determining section 501A of gateway 50 determines that both periods are unequal to (or incoincident with) each other and that the trouble in any one of the units in the information series network B. Then, a communications control section 503 of gateway 50 inhibits a passage of the transmission data having ID0001 of the transmitted data pulses 201 and 401 and its subsequent data pulses having ID0001. If the trouble is determined to occur, the gateway 50 (communication control section 503) transmits a promotion signal 500 (denoted by each broken line in FIGS. 4A and 4C) to the units from which the data having ID0001 is transmitted serially to request ID code change to a new ID code on the communications line 70.

Although the transmission data having ID0001 is transmitted from display unit 80, this ID0001 is outputted due to the trouble in the output circuit of display unit 80 but display unit 80 itself does not recognize that the data having ID0001 is being transmitted.

That is to say, display unit 80 recognizes that data having ID0011 is being transmitted, Therefore, signal 500 transmitted from gateway 50 on communications line 70 is retrieved by navigation unit 30 which recognizes that navigation unit 30 itself is transmitting the data having ID0001. Then, navigation unit 30 receiving signal 500 changes the ID code on the intersection data from ID0001 to ID0110 and transmits a change signal 501 to gateway 50 via communications line 70 to indicate gateway 50 to change the communications enabling (accepting) ID0001 to ID0110.

Thereafter, navigation unit 30 transmits intersection data pulses 601 through 603 to which the new ID code of ID0110 is added. It is noted that the new ID0110 is previously stored within navigation unit 30 as a spare ID code.

When gateway 50 receives signal 501 from navigation unit 30, gateway 50 (communications control section 503) is operated to change the communications enabling (accepting) ID0001 to the new ID0110 and transmits a signal 502 to indicate (or instruct) the recognizing ID when retrieving the intersection data to be changed from ID0001 to ID0110 to automatic transmission control unit 10.

After the change of communications accepting ID to ID0110, gateway 50 detects the transmission data pulses 601, 602, and 603 having ID0110 transmitted from navigation unit 30 as shown in FIG. 4C.

It is noted that gateway 50 stores communications accepting ID0001 and communications period of 500 milliseconds in the pair form (specifically, in the same address) in memory 502A and, when the set change procedure described above occurs, ID field is only rewritten from ID0001 to ID0110. In addition, the automatic transmission control unit upon receipt of the signal 502 changes the recognized ID to retrieve the transmitted data having ID0110 on the communication line 70 as intersection data.

Upon the above-described series 0 of ID change procedures, navigation unit 30 transmits intersection data pulses 601 and 602 having ID0110 on the communications line 70 at communications period of 500 milliseconds.

Since, after ID code change, gateway 50 accepts the access of the transmitted data having ID0110 and communications period of 500 milliseconds to the control system network A, the intersection data pulses 601 and 602 are enabled to pass gateway 50 to the control system network A. Since automatic transmission control unit 10 changes ID code to retrieve the transmitted data having ID0110 as the intersection data, automatic transmission control unit 10 retrieves the intersection data pulses 601, 602, and 603 on communications line 70.

Furthermore, since after the above-described ID change procedure, the destination set data pulses 412 through 422 having ID0001 from display unit 80 shown in FIG. 4B are not accepted by gateway 50, these data pulses are not transmitted from information system network B to control system network A.

In the first embodiment described above, in a case where the ID code ID0001 which can be accepted by gateway 50 is designated in the data format of the transmission data other than intersection data and is transmitted on communications line 70, the ID code of intersection data is changed from ID0001 to ID0110 by navigation unit 30 and the ID code which is the access accepting ID code and which is recognized as the receipt of the intersection data by automatic transmission control unit 10 has changed from ID0001 to ID0110.

Therefore, even if two separate transmission data having the same ID code (natural transmission data and unusual transmission data) are transmitted on communications line 70, gateway 50 can prevent the incoming of unusual transmission data from being passed to control system network A and the natural transmission data related to the vehicular run can reliably be transmitted to the control system network. Consequently, vehicle 100 can continue a normal running state.

It is noted that, in the first embodiment, the information that some output trouble occurs in any one of the units belonging to the information system network B may be transmitted from gateway 50 to display unit 80 and display unit 80 may display the above-described trouble information through display 81.

This display permits a vehicular occupant to recognize that the trouble occurs in any unit in the information system.

It is noted that each unit 10, 20, 30, 40, and 80 is provided with network interface card (module) NIC to communicate with any other unit via communications line 70 and terminators are attached to respective ends of communications line 70 and the network topology may be a star type or any other type other than a bus type.

FIG. 5 shows a modification of the first embodiment described above.

In this modification, communication protocols in both of a first information system network B1 and a second information system network B2 are different. Another gateway 60 is intervened on communications line 70 between the information system networks B1 and B2 to adjust the communications protocol.

For example, the units (nodes) to perform calculations and communications in accordance with standard communications protocol are connected to communications line 70 in the case of the second information system network B2. The audio unit 40 and display unit 80 of the information system network B1 perform calculations and communications in accordance with any communications protocol which is different from the standard communications protocol, for example, a manufacturer's own communications protocol.

As described above, although the information system network B is constituted by a plurality of networks B1 and B2 whose communications protocols are different, the same advantages can be achieved by providing the same functions as described in the first embodiment for both gateways 50 and 60.

(Second Embodiment)

In the first embodiment, gateway 50 monitors whether the transmission data having ID0001 is provided with communications period of 500 milliseconds.

On the other hand, in the second embodiment, the monitoring function is provided in navigation unit 30.

It is noted that since the circuit block diagram of the communications network in the second embodiment is the same as FIG. 1A except the circuit contents of gateway 50 in the first embodiment, the detailed explanation of the second embodiment will be made with reference to FIG. 1A.

Navigation unit 30 transmits intersection data having ID0001 and road gradient data having ID0010 to communications line 70 and has the function that always monitors the ID codes of the transmission data and their communications periods of the transmitted data on communication on specific ID codes (ID0001 and ID0010) which are accepted in gateway 50.

It is noted that, in navigation unit 30, the monitored ID codes and their communications periods are previously stored in the pair form as (ID, communications period)= (ID0001, 500 (milliseconds)), (ID0010, 100 (milliseconds)).

Navigation unit 30 compares the communications periods of the transmitted data having ID0001 and ID0010 on communications line 70 with the stored communications periods. If the detected communications period is different from those stored, navigation unit 30 determines that the trouble in any one of the units connected to communications line 70 including navigation unit 30 itself has failed and that the transmission data having different ID0001 and ID0010 from natural ID codes are being transmitted on communications line 70.

Navigation unit 30 transmits the ID code change requesting the signal to communications line 70 to one of the units from which the transmission data having ID0001 is transmitted on communication line 70. This signal indicating ID code change request is retrieved by navigation unit itself 30.

Navigation unit 30 changes the ID code of intersection data from ID0001 to the preliminarily prepared ID0110 and transmits the ID code change completion signal indicating that the ID code of transmitted data has changed from ID0001 to ID0110 to communications line 70.

Navigation unit 30, then, transmits intersection data with ID code of ID0110 designated to ID code field (AF) after ID code change completion signal.

It is noted that one of the units (nodes) which is transmitting data having ID0001 but not at communications period of 500 milliseconds does not recognize that the unit itself is transmitting the data having ID0001 in the same manner as display unit 80 described in the first embodiment but recognizes that the data having the ID code is allocated to the unit itself is transmitted. Therefore, this unit does not retrieve the signal to promote the unit to change ID code from navigation unit 30.

Gateway 50, in the second embodiment, receives the signal indicating the completion of ID code change from navigation unit 30. Gateway 50 changes from ID0001 stored as the communications accepting ID to ID0110 on the basis of ID change completion signal. It is noted that, in the same way as the first preferred embodiment, no modification can be made on the communications period of 500 (milliseconds) storing the communication enabling ID0001 in pair.

Automatic transmission unit 10 receiving this information is retrieved from communications line 70 as intersection data. It is noted that, as well as in the case of the second embodiment, the information that the trouble occurs in any one of the units in the information system network B may be displayed.

As described above, transmission data having ID0001 and ID0010 are monitored by means of navigation unit 30 constituting information system network B. Hence, the same advantage as the first preferred embodiment can be achieved. A normal vehicular run can be continued.

It is noted that although the vehicle is exemplified, the present invention is not limited to the vehicle but is applied to various communications network system.

It is also noted that a data transmission unit defined in the following claims corresponds to the navigation unit 30 and display unit 81, a data reception unit defined therein corresponds to either or both of automatic transmission control unit 10 and the vehicular velocity control unit 20, a communications acceptance unit and a determining unit defined therein correspond to gateway 50 (50 or 60) in the first embodiment and to navigation unit 30 in the second embodiment, and a communications control unit defined therein corresponds to gateway 50 in the first embodiment and to navigation unit 30 in the second embodiment. It is also noted that although, in the explanation of the first embodiment with reference to FIGS. 3A through 4D, the ID codes and the communications periods which serve as the communication acceptance ID codes and communications periods thereof are stored in two pairs in memory 502A, these communications acceptance ID codes may previously stored up to N number with or without the corresponding acceptance communications periods for spare purposes.

The entire contents of a Japanese Patent Application No. 2000-138197 (filed in Japan on May 11, 2000) are herein incorporated by reference. Although the present invention has been described above by reference to certain embodiment, the present invention is not limited to the preferred embodiment described above.

Modifications and variations of the embodiments described above will occur to those skilled in the art in the light of the above teachings.

The scope of the invention is defined with reference to the following claims.

What is claimed is:

1. A communications network system, comprising:

a communications line;

a data transmission unit that transmits a data having a specific ID code at a predetermined communications period to the communications line;

a data reception unit that receives the data transmitted from the data transmission unit on the communications line;

a determining unit that determines whether a communications period of the transmitted data on the communications line having the ID code which is equal to the specific ID code which is set as a communications acceptance ID code is coincident with the predetermined communications period; and a communications acceptance unit that accepts a communication of the data from the data transmission unit to the data reception unit only if the data provides the ID code which is equal to the specific ID code and provides the communications period which is coincident with the predetermined communications period determined by the determining unit.

2. A communications network system as claimed in claim 1, further comprising a communications control unit that indicates the data transmission unit and the communications acceptance unit to change both of the ID code of the data when the data is to be transmitted from the data transmission unit and the communication acceptance ID code to a new ID code which is different from the specific ID code if the determining unit determines that the communications period of the transmitted data is incoincident with the predetermined communications period.

3. A communications network system as claimed in claim 1, wherein the data transmission unit transmits a plurality of data on the communications line, each data providing a mutually different ID code of first through an n-th number ID code at N-th number mutually different predetermined communications periods, and the determining unit determines whether the communications period of the data which is transmitted from the data transmission unit on the communications line and which provides the ID code which is equal to the corresponding one of communications acceptance ID codes is coincident with one of the predetermined communications periods which corresponds to that of the corresponding one of the first through N-th number ID codes.

4. A communications network system as claimed in claim 3, wherein the communications acceptance unit accepts the communication of the data from the data transmission unit to the data reception unit only if the transmitted data provides the ID code which is equal to the data whose communications period is determined to be coincident with the corresponding one of the predetermined communications periods by the determining unit.

5. A communications network system as claimed in claim 3, further comprising a communications control unit that indicates the data transmission unit to change the ID code, when the transmitted data having the ID code which is equal to that of the data whose communications period is determined to be incoincident with the corresponding one of the predetermined communications periods by the determining unit, to a new ID code which is different from any one of the first through N-th number ID codes and indicates the communications acceptance unit to change the communications acceptance ID code which is equal to the ID code of the data whose communication period is determined to be incoincident with the corresponding one of the predetermined communications periods by the determining unit to the new ID code.

6. A communications network system as claimed in claim 5, wherein the data transmission unit changes the ID code of the data to be transmitted therefrom on the communication lines to the new ID code which is a spare ID code in response to an indication by the communications control unit to change the ID code to the new ID code.

7. A communications network system as claimed in claim 5, wherein the ID code is provided in an arbitration field of a predetermined data format of the data on the communications line after a SOF field.

8. A communications network system as claimed in claim 5, wherein the communications control unit transmits a signal indicating a change of the ID code of the data transmitted from the data transmission unit to the new ID code to the data reception unit.

9. A communications network system as claimed in claim 8, wherein the determining unit, the communication acceptance unit, and the communications control unit are constituted by a gateway intervened on the communications line connected between a control system local area network including the data reception unit and a information system local area network including the data transmission unit.

10. A communications network system as claimed in claim 9, wherein the gateway comprises a memory to store pairs of the communications acceptance ID codes and their corresponding predetermined communications periods in pairs and wherein the gateway compares the ID code of the data transmitted on the communications line and its corresponding communications period with those stored in pair into the memory to determine whether both of the ID code and its corresponding communications period are coincident with the stored specific ID code and its corresponding stored predetermined communications period.

11. A communications network system as claimed in claim 10, wherein the data reception unit of the control system local area network comprises a vehicular automatic transmission control unit and a vehicular velocity control unit and the information system local area network comprises a car navigation unit; an audio unit; and a display unit.

12. A communications network system as claimed in claim 11, wherein the gateway transmits a signal to the display unit, the signal indicating that the communications control unit changes the communications acceptance ID code to the new ID code due to a trouble in the information system network.

13. A communications network system as claimed in claim 10, wherein the information system local area network is divided into two local area networks and the same gateway module is intervened on the communications line connected between the two local area networks, the one local area network comprising the car navigation unit and the other local area network comprising the audio unit and the display unit.

14. A communications network system as claimed in claim 5, wherein the determining unit, the communication acceptance unit, and the communications control unit are provided in a car navigation unit which constitutes the data transmission unit and belongs to an information system local area network and wherein the data reception unit constitutes a control system network, the information system network and control system local area network being connected together via a gateway module.

15. A communications network system, comprising:

communications line means;

data transmission means for transmitting a data having a specific ID code at a predetermined communications period to the communications line means;

data reception means for receiving the data transmitted from the data transmission means on the communications line means;

determining means for determining whether a communications period of the transmitted data on the communications line means having the ID code which is equal to the specific ID code which is set as a communications acceptance ID code is coincident with the predetermined communications period; and communications acceptance means intervened on the communications line between the data transmission unit and the data reception unit for accepting a communication of the data from the data transmission unit to the data reception unit only if the data provides the ID code which is equal to the specific ID code and provides the communications period which is coincident with the predetermined communications period determined by the determining means.

16. A method applicable to a communications network system, the communications network system comprising:

a communications line;

a data transmission unit that transmits a data having a specific ID code at a predetermined communications period to the communications line; and a data reception unit that receives the data transmitted from the data transmission unit on the communications line, the method comprising:

determining whether a communications period of the transmitted data on the communications line having the ID code which is equal to the specific ID code which is set as a communications acceptance ID code is coincident with the predetermined communications period; and accepting a communication of the data from the data transmission unit to the data reception unit via the communications line only if the data provides the ID code which is equal to the specific ID code and provides the communications period which is coincident with the predetermined communications period determined at the determining step.

* * * * *